UNITED STATES PATENT OFFICE.

RUDOLF HAUGWITZ, OF FRIEDRICHSHAGEN, NEAR BERLIN, GERMANY, ASSIGNOR TO ACTIEN GESELLSCHAFT FÜR ANILIN FABRIKATION, OF BERLIN, GERMANY.

SULFUR DYE AND PROCESS OF MAKING SAME.

958,640.  Specification of Letters Patent.  Patented May 17, 1910.

No Drawing.  Application filed March 23, 1909. Serial No. 485,237.

*To all whom it may concern:*

Be it known that I, RUDOLF HAUGWITZ, citizen of the German Empire, residing at Friedrichshagen, near Berlin, my post-office address being Friedrichshagen, near Berlin, Seestrasse 97, have invented certain new and useful Improvements in New Sulfur Dyes and Process of Making Same, of which the following is a specification.

I have found that valuable new sulfur dyes can be obtained by heating para-phenylenediamin with sulfur in the presence of a toluene derivative, having a general formula:

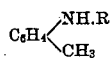

in which R stands for a hydrogen atom or for the radical of an organic acid, such as for instance $CO.CH_3$ or $CO.H$. The products thus obtained dye cotton without a mordant from a dye-bath containing an alkali-sulfid and preferably a suitable salt, such as sodium sulfate or common salt, generally speaking, olive tints, which are very fast to washing and fast to light.

In order to illustrate my invention I give the following example, the parts being by weight: 107 parts of ortho-toluidin are heated together with 162 parts of para-phenylenediamin and 167 parts of sulfur while stirring and using a reflux condenser during about 8 hours to 220 to 240° C. The melt thus obtained is introduced while heating or boiling into a mixture of 2460 parts of crystallized sodium sulfid and 1230 parts of water. The dye having been completely dissolved it is separated in the usual manner, for instance by introducing a current of air or by adding an acid; it is then obtained by filtering, drying and pulverizing in the shape of a dark green to blackish colored powder. This dye produces on cotton from a dye-bath containing an alkali sulfid and Glaubers salt or common salt olive tints which are fast to light and very fast to washing.

This new dye is insoluble in water and in alcohol, partially soluble in diluted soda-lye on heating to an olive colored solution and very sparingly soluble in a hot solution of sodium carbonate. It totally dissolves in a sodium sulfid solution to an olive colored solution but is insoluble in concentrated sulfuric acid at ordinary temperature. The tints obtained on cotton with this new product become more dull by an after-treatment with potassium bichromate or with potassium bichromate and copper sulfate.

It is obvious that my present invention is not limited to the foregoing example or to the details given therein, and many variations may be made in this example without departing from the scope of my present invention. Thus for instance the proportions of toluidin and para-phenylenediamin may be varied within wide limits; the tints of the resulting products depend to a great extent upon the special proportions used. Thus more green or more yellow products may be obtained according to my present invention, as I have found that in increasing the proportion of phenylenediamin the tints become more greenish, whereas a greater proportion of a toluidin yields more yellowish products. I may also state that the duration of the heating has a certain influence upon the tints obtained with my products.

If instead of ortho-toluidin used in the foregoing example, according to the above given formula, another toluidin or a formyl- or acetyl-toluidin is employed only little variation in the shade obtained with the resulting products will occur. It is also convenient to state that for the para-phenylenediamin para-nitranilin may be substituted without essentially altering the result; furthermore instead of a toluidin a so-called thio-toluidin may be employed. Also in these cases I do not depart from the scope of my invention.

Having now described my invention and the manner in which it may be performed, what I claim is,—

1. As new articles of manufacture the dyes which may be obtained by heating para-phenylenediamin with sulfur in the presence of a toluene derivative of the general formula:

in which formula R means a hydrogen atom or the radical of an organic acid, these products producing on cotton without a mordant from a dye-bath containing an alkali sulfid and preferably a suitable salt, generally speaking, olive tints, which are very fast to washing and fast to light, which products form when pulverized dark green to blackish powders which are insoluble in water and alcohol and which are partially soluble in diluted soda-lye on heating, these dyes being totally soluble in a sodium sulfid solution to an olive colored solution and which products are insoluble in concentrated sulfuric acid in the cold, the tints obtained on cotton becoming more dull by an after-treatment with potassium bichromate or with potassium bichromate and copper sulfate.

2. As a new article of manufacture the new sulfur dye which may be obtained by heating para-phenylenediamin with ortho-toluidin and sulfur to 220–240° C., this new dye being when pulverized a dark green to blackish colored powder which is insoluble in water and in alcohol, partially soluble in diluted soda-lye on heating to an olive colored solution and very sparingly soluble in a hot solution of sodium carbonate, and which new dye is insoluble in concentrated sulfuric acid at ordinary temperature, but is totally soluble in sodium sulfid to an olive colored solution, from which solution, more especially on the addition of Glaubers salt or common salt, unmordanted cotton is dyed olive tints which the very fast to washing and fast to light, and which tints by an after-treatment with potassium bichromate or with potassium bichromate and copper sulfate become more dull.

In testimony whereof I have hereunto set my hand in presence of two subscribing witnesses.

RUDOLF HAUGWITZ.

Witnesses:
HENRY HASPER,
WOLDEMAR HAUPT.